Sept. 5, 1939.   T. THEODORSEN ET AL   2,172,334
SUSTAINING ROTOR FOR AIRCRAFT
Filed Nov. 27, 1936   5 Sheets-Sheet 1

Sept. 5, 1939.  T. THEODORSEN ET AL  2,172,334
SUSTAINING ROTOR FOR AIRCRAFT
Filed Nov. 27, 1936   5 Sheets-Sheet 5

Inventors:
Theodore Theodorsen
and Edward F. Andrews,
By John F. Eakins
Attorney.

Patented Sept. 5, 1939

2,172,334

UNITED STATES PATENT OFFICE 2,172,334

SUSTAINING ROTOR FOR AIRCRAFT

Theodore Theodorsen, Hampton, Va., and Edward F. Andrews, Chicago, Ill.

Application November 27, 1936, Serial No. 112,888

37 Claims. (Cl. 244—17)

This invention relates to sustaining rotors for aircraft, and particularly to sustaining rotors having blades composed of a large number of sections hinged together on axes generally parallel to the chord of the blades so that they may be wound up around a polygonal drum for storage in compact compass when out of operation or when only part of the blades is being used. The rotating wing system of this invention may be driven by air forces as an autogyro, or by power applied to the blades as a helicopter. The inertia of the rotating blades may be used to effect the winding up of the blades around the drum.

This invention relates to a special type of coilable rotating wing generally described and claimed in our copending application, Serial No. 97,804, filed August 25, 1936.

This general type of wing is flexible and relatively nonresonant and, during rotation, the lift of its blades is balanced by centrifugal force. In normal operation the wing is rolled up into a coil of relatively small diameter before its rotation ceases.

The improved coilable rotating wing herein described and claimed, is of this general type, but is characterized by a high degree of rigidity in the plane of its chord, and by a high degree of torsional rigidity tending to hold the chord of the entire wing in fixed relation to the axis of rotation. To provide this rigidity in a wing with many joints, the play in the joints and the change of angle resulting therefrom should be reduced as far as possible. To attain that object, it is preferred to make the hinges between adjacent sections as long as possible and preferably practically coextensive with the chord of the blade.

Preferably, the sections are in the form of hollow, rigid elements, and a large number of individual hinge elements are provided at close intervals along the chord of the section to provide a uniform distribution of tension and other forces to the walls of the section. The adjacent wing sections being pivoted together substantially in the line of the chord, the wing is extremely flexible in the direction of its thickness so that it may yield in a vertical direction to the air forces under the restraining influence of centrifugal force while being stiff in the plane of its chord and can be wound up around the drum with its chord parallel to the axis of the drum.

This rigidity in a fore and aft direction or in the plane of the chord is advantageous in that it insures that the wing will wind up on the drum with one layer directly on top of the other without skewing and without the necessity of any guides on the drum. It also conduces to stable operation. Further, if the structure is used as a helicopter, this rigidity operates to impart stiffness to the blade in the plane of the torque.

It is also desirable that the blade, at a point near the hub, be permitted a certain degree of freedom to yield under periodic strain in the plane of its chord. This freedom should be present when the wing is being wound or unwound, or when in operation in a partly unwound condition as well as when fully extended. To attain this desirable condition while preserving the advantage of a wing which is rigid in the plane of rotation and which will wind up upon the drum without skewing with relation thereto, the drum as a whole is allowed to pivot in a generally horizontal plane.

The structure disclosed realizes to a large degree the aerodynamic and other advantages of the coilable rotating wing with a large measure of torsional stiffness per unit of weight and with a relatively simple and inexpensive construction. This structure permits simple and effective means for winding and unwinding the wings, for providing for their rotation, both mechanically and under the influence of air forces, and for inclining the axis of rotation of the wing system as a whole relative to the aircraft for the purpose of control.

Other desirable characteristics, advantages and capabilities of the invention will appear from the following description of a preferred embodiment thereof taken in conjunction with the accompanying drawings, in which.

Figure 1:
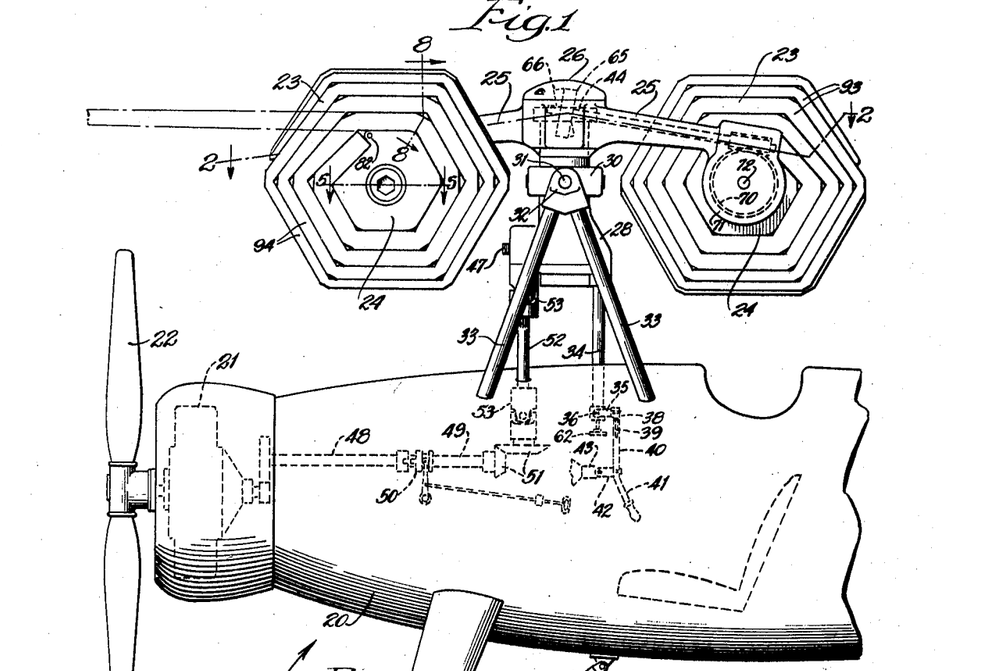
Figure 1 is a fragmentary elevation of an aircraft embodying our invention.
Figures 3, 4:
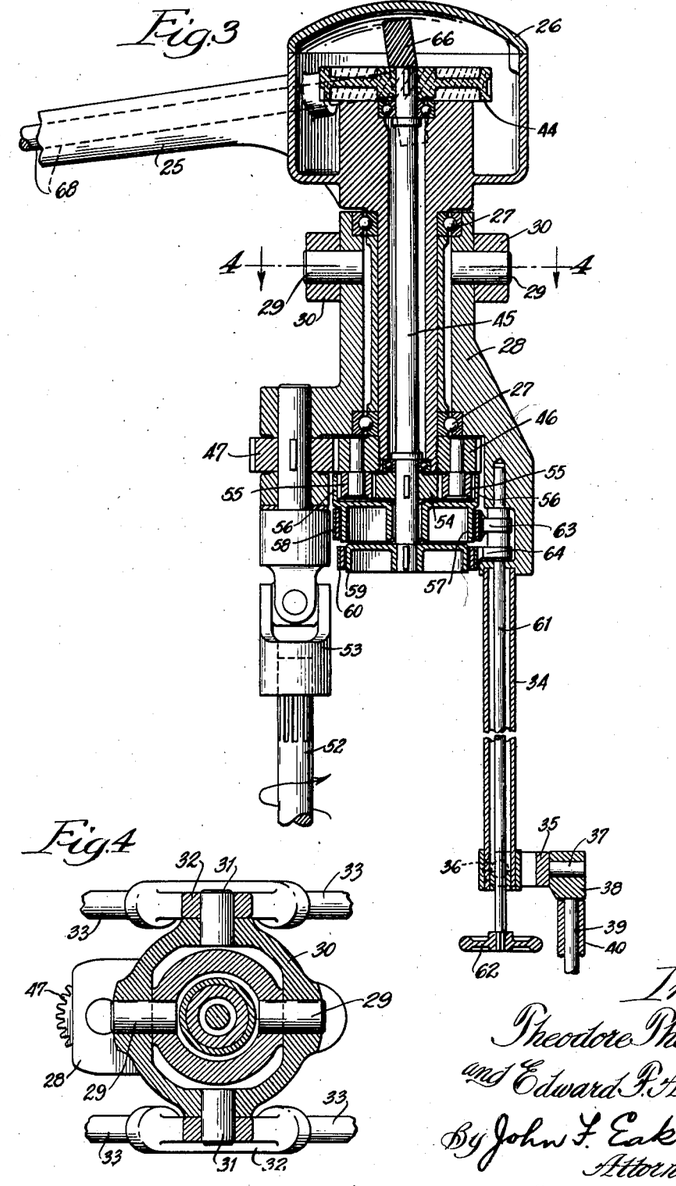
Figure 3 is a sectional view on a larger scale, taken on the line 3—3 of Figure 2, and showing the manner in which the wing is controlled.
Figure 4 is a sectional view taken on the line 4—4 of Figure 3.

Referring to the accompanying drawings, the reference numeral 20 designates the fuselage of an aircraft which includes an engine 21, propeller 22 and tail 119. The supporting rotor comprises two wings 23 which are shown in Figure 1 wound up upon drums 24. The drums 24 are carried by arms 25 extending outwardly from a rotatable hub or housing 26. As best seen in Figure 3, the rotatable hub or housing 26 is mounted by means of bearings 27 upon a swinging member 28. The swinging member 28 is provided with trunnions 29 which are rotatably mounted on the ring member 30. The ring member 30 is provided with trunnions 31 located at right-angles to the trunnions 29, and the trunnions 31 have bearings in I members 32 which are rigidly mounted on the fuselage by means of the struts 33.

The swinging member 28 rigidly carries a depending tubular member 34, to the lower end of which a yoke 35 is pivotally connected by pins 36. The yoke 35 carries a pin 37 having an axis at right-angles to the axes of the pins 36. On the pin 37 is pivotally mounted a head 38, which is rigidly connected to a rod 39. The rod 39 has a telescoping fit in a tubular member 40. The tubular member 40 is mounted for universal movement so that it can be moved in any desired direction by means of a handle 41 integral therewith. For example, the tubular member 40 may be pivoted to a yoke 42 which in turn is pivotally mounted to a member 43 mounted on the fuselage. The axis of the pivot between the members 40 and 42 and the axes of the pivots between the members 42 and 43 are located at right-angles to each other so that the handle 41 may be moved in any desired direction, with the result that the hub 26 is canted in any direction desired for control of the aircraft. The member 28 swings freely in any direction, owing to the universal mounting provided by the trunnions 29 and 31.

The hub 26 serves as a housing for helical gear 44 which is rigidly carried by a shaft 45 which extends through the center of the member 28. At its lower end the hub 26 has rigidly mounted thereon a gear 46 which is in mesh with a pinion 47. The pinion 47 is driven from the engine 21 through a shaft 48, a shaft 49 which can be engaged with the shaft 48 by means of a manually operated clutch 50, beveled gears 51 and shaft 52 which is connected to the beveled gearing 51 and the pinion 47 by means of universal joints 53. The shaft 52 is splined into the lower member of the upper universal joint 53, to permit the free movement of the member 28.

Below the gear 46, the shaft 45 has rigidly mounted thereon a pinion 54 which meshes with planetary gears 55 which are rotatably carried on the under side of the gear 46 and which mesh with the internal gear 56. Internal gear 56 is mounted for free rotation on the lower part of the shaft 45. It includes a cylindrical portion 57 which serves as a brake drum and is adapted to be operatively engaged by means of a brake band 58. Below the brake drum 57 the shaft 45 has rigidly mounted thereon a brake drum 59 which is adapted to be engaged by means of a brake band 60. The brake bands 58 and 60 may be contracted alternately by suitable actuation of a shaft 61 in one direction or the other. The shaft 61 extends through the tubular member 34 and carries at its lower end a hand wheel 62. At its upper end the shaft 61 carries cams 63 and 64 whereby said brake band 58 or 60 may be applied as desired.

Figure 2:
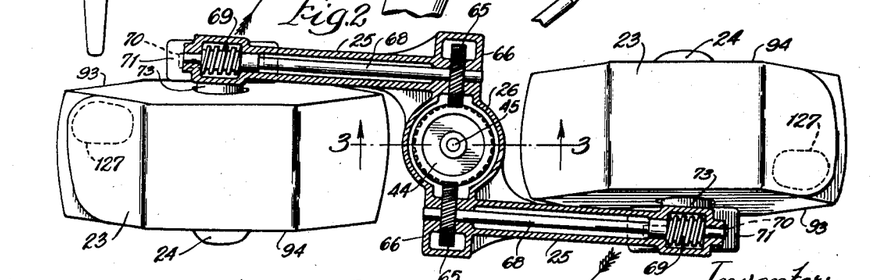
Figure 2 is a plan view partly in section, the section being taken on the line 2—2 of Figure 1.
Figure 5:
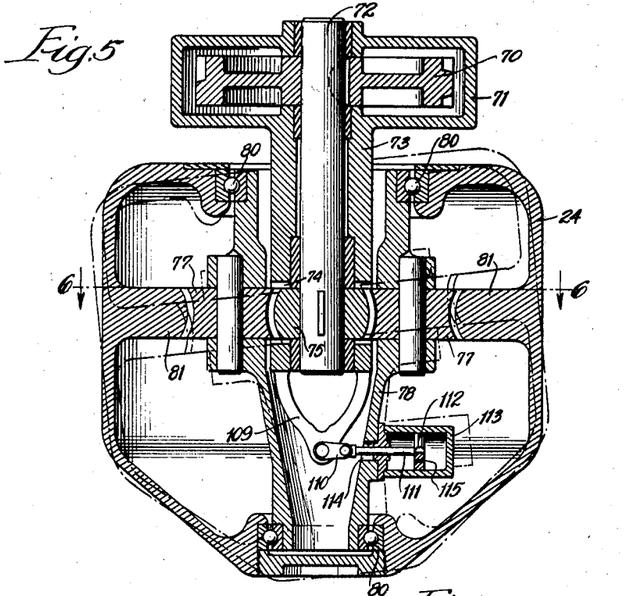
Figure 5 is a sectional view on a larger scale, taken on the line 5—5 of Figure 1, showing the manner in which the drum is mounted and driven.

The helical gear 44 engages two opposite spiral gears 65 which are located in lateral extensions 66 of the hub 26. The tubular arms 25 extend outwardly from the extensions 66 in opposite directions, as best seen in Figure 2. The arms 25 serve as housings for shafts 68 upon which the spiral gears 65 are rigidly mounted. At their other ends the shafts 68 carry spiral gears 69 which cooperate with spiral gears 70 which are located in housings 71 integral with the arms 25, and consequently with the hub 26. The spiral gear 70 is rigidly mounted on shaft 72 which extends through a hub member 73 which is integral with the housing 71, as best seen in Figure 5.

The hub member 73 is provided with a slot 74 near its extremity remote from the gear 70, and in this slot is located a gear 75 having a spherical face. This gear is keyed to the shaft 72 so as to rotate therewith. At the location of the gear 75 the hub member 73 is provided with upwardly and downwardly directed trunnions 76, the axis of which is at right-angles to the axis of the shaft 72. The axis of the trunnions 76 lies in the medial plane of the gear 75.

Figures 6, 7:
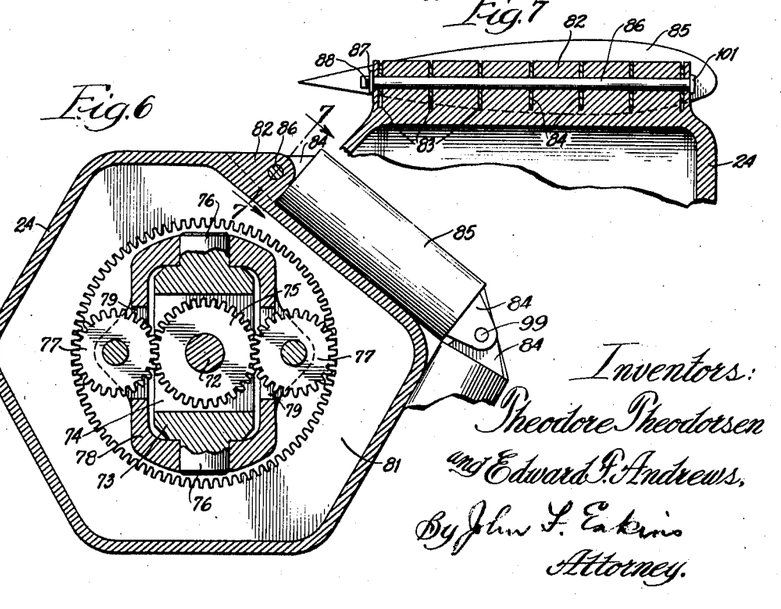
Figure 6 is a sectional view through the drum, taken on the line 6—6 of Figure 5.
Figure 7 is a sectional detail of the drum, taken on the line 7—7 of Figure 6.

The gear 75 meshes with two gears 77 which are rotatably mounted in a hub 78. The gears 77 have toothed edges of concave formation to adapt them to cooperate with the spherical gear 75. The hub 78 has openings on its upper and lower sides for the reception of the trunnions 76, and the gears 77 operate in openings 79 in the sides of the hub 78, as best seen in Figure 6.

At its inner and outer ends the hub 78 carries, by means of bearings 80, the drum 24. The drum 24 is a hollow member provided at an intermediate position with an internal ring gear 81. The ring gear has teeth which are convex in form and engage the gears 77.

It will readily be understood that when the shaft 72 is rotated the gears 77 are likewise rotated, owing to the fact that the hub 78 on which they are pivotally mounted is prevented from rotation by the trunnions 76. As a result of the rotation of the gears 77, the internal gear 81 of the drum 24 is rotated in a direction opposite to the direction of rotation of the shaft 72.

It will be noted that the drum 24 and the hub 78 can swivel in a substantially horizontal direction with respect to the shaft 72 and the hub 73, the spherical gear 75 permitting such swinging.

Damping means, which will hereinafter be more fully described, are preferably provided to lessen and decrease movements or vibrations of the drum about the trunnions 76.

It may here be noted that the spiral gears 69 and 70 are non-reversing so that the centrifugal force of the wings has no tendency to unwind the blade from the drum. Consequently, the device is self-locking, and all that needs to be done is to feed out any desired length of wing, and when sufficient has been extended it is merely necessary to stop the drive of the drums to maintain the extension of the wings unchanged.

The manner in which the blades are unwound is as follows: The engine 21 being in operation, the clutch 50 is engaged, with the result that the hub 26, together with the dums 24 carried thereon, are caused to rotate bodily around the axis of the hub 26, the drive being effected by gears 47 and 46. The hand wheel 62 is then rotated so as to cause the brake 58 to engage. This brake is preferably arranged to impede the movement of the drum 57 and the internal gear 56 but preferably it is not strong enough to lock these elements against rotation under heavy resistance.

The result of the slowing up of the internal gear 56 relative to the gear 46 is that the planetary gears move relatively to the internal gear and drive the shaft 45 at a higher speed. Before the application of the brake 58 the shaft 45 rotated at the same speed as the hub 26. When it is rotated at a higher speed it causes the rotation of the drums 24 in a direction to extend the blades. The centrifugal force of the blades tends to move the projected portions outwardly in a radial direction.

If the brake 58 remains engaged for a sufficient period, the blades will be extended completely. Owing to the slippage of the brake 58, the blades will not be rewound in the opposite direction. They will remain in their full extended position and the drum 57 will merely slip relatively to the brake 58. The brake 58 should, however, be disengaged when the blades are fully projected. If it is not desired to project the blades to the fullest extent, the brake 58 is disengaged when the desired extension of the blades is attained and, owing to the non-reversing characteristic of the spiral gears 69 and 70, the drums 24 are automatically locked and the centrifugal force of the blades is unable to effect further extension of the blades. The brake 58 may also be used to retard the rotation of the assembly, if desired.

If the rotor is intended to operate as an autogyro, the clutch 50 is disengaged and the rotor assembly is maintained in operation by the air forces. If, however, the rotor is intended to operate as a helicopter, the power drive is maintained.

When it is desired to wind the blades up on their drums, the hand wheel 62 is rotated so as to apply the brake 60 to the drum 59. When this is done the shaft 45 is arrested, likewise, the helical gear 44. The spiral gears 65 are carried around the helical gear 44 and are caused to rotate about their axes by their meshing engagement with the gear 44. This results in the rotation of the shaft 68 and the worm 69, with the result that the drums 24 are driven so as to wind up the blades thereon. The winding up of the wing may be arrested at any time so that any desired length of wing may remain effective. Normally, the wings are fully extended for landing, and after landing the brake 60 is applied to wind up the wings. When this is done the aircraft has a large ground stability and resists any tendency to overturn.

The trunnions 29 and 31, which provide for the universal mounting of the rotor upon the aircraft, are located on substantially the same level as the axes of the drums 24. The result is that when the blades are fully extended their inner ends are substantially in alignment with the universal joint, and the rotor as a whole may be adjusted by hand by means of the lever 41 with the application of relatively small force.

The outer end of the hub 73 is provided with an extension 109 to which is pivotally mounted a link 110. The link 110 is pivotally connected to the rod 111 of a piston 112 of a dash-pot 113. The dash-pot 113 is rigidly mounted on the hub 78, and the rod 111 extends through an opening 114 in said hub. The piston 112 is provided with a metering orifice 115 which can be made of any desired size. It will readily be understood that the dash-pot 113 serves as a damping means to damp swinging movements of the drum with respect to the hub 73, that is, movements resulting from the swinging of the hub 78 about the trunnions 76 carried by the hub 73.

It will be understood that the air resistance of the rotor should be kept as low as possible, particularly where high speed performance is desired. For this purpose the drums 24 may be reduced in size so that they offer little air resistance when the blades are fully extended. The drums supporting arms 25 and the general supporting structure of the rotor may be streamlined in any suitable manner so as to reduce air resistance.

It will be understood, particularly with reference to Figure 2, that the axes of the drums 24 are not parallel since they extend upwardly in the direction of rotation so as to locate the forward edge of the blade above the trailing edge and provide the angle of incidence necessary for aerodynamic support.

The drum 24 is preferably polygonal in cross-section. As seen in Figure 6, it may be substantially hexagonal, departing from a true hexagonal section, merely to provide for the securement of the inner blade section thereto. For this purpose one of the sides of the polygon is provided with a boss 82 which is provided with a plurality of slots 83. The slots 83 receive perforated triangular-shaped tabs 84 which project from one end of the innermost section 85 of the blade. A rod 86 extends through aligned openings in the boss 82 and tabs 84, being secured in position by means of a washer 87 and cotter pin 88.

It is to be understood that the hinge pin 86 is parallel to the axis of the drum 24 and hub 78. Consequently, the extended wing, being rigid against torsion, maintains its angle of incidence. The hub 78 being free to move on a generally vertical axis with respect to the shaft 72 and supporting hub 73, but being rigidly held against relative movement on a horizontal axis, the angle of incidence of the blade is maintained notwithstanding the degree of freedom between the drum 24 and the supporting hub 73.

Referring to Figure 1, it will be readily understood that the sections of the blade are of appropriate length to enable the whole blade to be wound up on the drums 24. Because of the increasing size of the hexagon with each added layer of wing wound thereon, the sections are made longer in each successive layer outwardly from the point of attachment. We prefer to make the blade sections of metal, with a high ratio of strength to weight.

In one manner of making a blade section, a piece of metal is stamped so as to provide adjacent deformations corresponding to the upper wall 89 and the lower wall 90 (Figure 8) of the desired air foil section, and also to provide end wall portions 91 and 92 adjacent the upper and lower walls 89 and 90. The two portions are bent around the forward edge 93 so as to bring the end wall portions 91 and 92 into contact and to bring the two extreme ends of the piece of metal into contact to provide the trailing edge 94.

The assembly of the box-like structure which constitutes the wing section is completed by welding along the lines 95 between the abutting edges of the wall portions 91 and 92 and along the trailing edge 94. Before the welding is done the other elements of the wing section are installed. Thus slots 96 are cut in the end wall portions 91 and 92 and a strip of metal 97, corresponding in shape to the end walls of the section, is inserted adjacent the end wall portions 91 and 92.

The strip 97 has struck up therefrom the metal tabs 84 which are of generally triangular form and are provided with central openings 98 for the reception of the pivot pin 86 or pivot pins 99 between adjacent sections. The tabs 84 are located, of course, so that they register with the slots 96 in the end wall portions 91 and 92. The strip 97 may be secured to the adjacent wall portions 91 and 92 by any suitable means, for example, by spot-welding. It may here be noted that a large number of closely located tabs 84 are provided and that they extend as near as possible to the front and rear of the sections so as to provide a hinge with a high resistance to torsion and to distribute the strains over the whole section.

Figure 8:
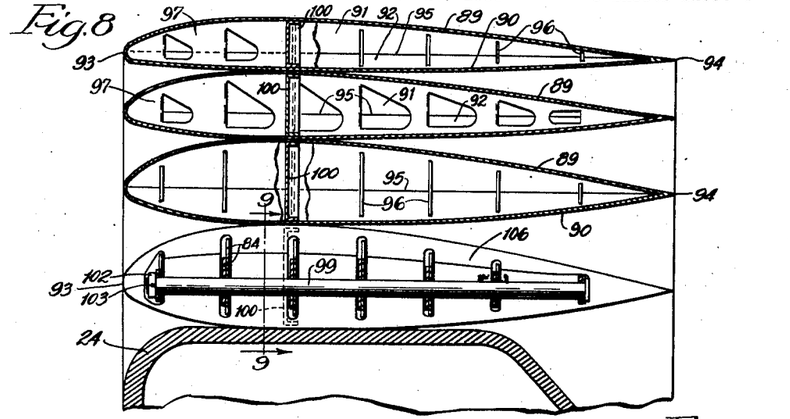
Figure 8 is a sectional view through the wing in wound up condition, the view being taken on the line 8—8 of Figure 1 and being on a substantially larger scale.

The blade sections are wound up on the drum in the manner shown in Figure 8, from which it will be seen that the superimposed wing sections contact each other in a plane which is substantially at right-angles to the axis of the drum. We reinforce the wing sections against crushing when being wound or unwound by providing in this plane reinforcing members 100 which may be in the form of a strip of metal having its edges turned to provide a U beam structure.

The edges of the U beam structure 100 along the length thereof are secured, for example, by spot-welding to the upper and lower curved surfaces of the air-foil section. The end flanges of the reinforcing member 100 may be secured by welding or otherwise to the reinforcing strips 97. By providing the reinforcing members 100 substantially in the only plane in which there is any tendency for the superimposed layers or sections to make contact with and deform each other, we effectively prevent such deformation and provide a very simple wing structure which can be wound up accurately on a drum without skewing and without the aid of any guides.

The rigidity against torsion provided by our elongated hinges extending substantially the whole length of the chord of the sections causes the wing to wind up accurately on the drum when the same is rotated. A further effect of the long hinge is to reduce to a minimum the change in angle of the wing from root to tip with any given amount of play in the joints when subject to torsion. Thus, the angle of the whole blade may be held close to the angle desired by the torsional stiffness and the angle at which the drum, to which the wing is attached, is mounted with relation to the axis of rotation of the whole wing system.

The outside covering of our improved wing section, that is, the walls 89 aand 90, performs three functions. In the first place, they serve as tension members taking most of the tension of the extended wing, which tension is distributed by the long hinge and closely spaced tabs 84 substantially over the whole area of the covering; secondly, they serve to resist torsion in the wing; and finally, they serve as the outside cover of the wing section.

Figures 9, 10, 11, 12, 14:
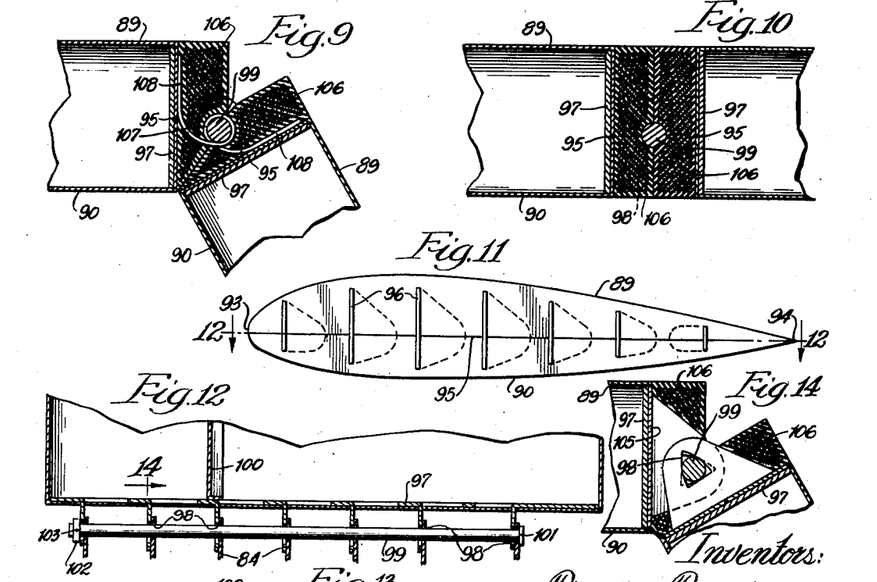
Figure 9 is a sectional detail view taken on the line 9—9 of Figure 8, showing the manner in which the blade bends when wound up.
Figure 10 is a similar sectional view showing the blade in extended condition.
Figure 11 is an end view of one of the wing sections.
Figure 12 is a sectional view taken on the line 12—12 of Figure 11, showing the construction of the end of a wing section and the manner in which adjacent sections are joined together.
Figure 14 is a sectional detail view taken on the line 14—14 showing a modified form of hinge structure.

Adjacent wing sections are pivotally secured together by means of pivot pins 99 which pass through the aligned openings 98 in the adjacent tabs 84 of the adjacent sections. As shown in Figure 12, the hinge pin 99 may be secured against longitudinal movement by a head 101 at one end and collar 102 and cotter pin 103 at the other end.

The holes 98 in the tabs 83 may be made to taper outwardly from the section carrying them, as shown in Figure 14. As a result of this construction, the tension of the blade tends to locate the pin 99 firmly in the outer reduced ends of the openings 98 so that even after considerable wear there will be no loss of torsional rigidity when the blade is in use. The centrifugal force exerted on the rotating blade keeps the pins 99 firmly against the reduced portions of the openings 98 and takes up any tendency of free play between adjacent sections around the longitudinal axis of the blade.

Figure 13:
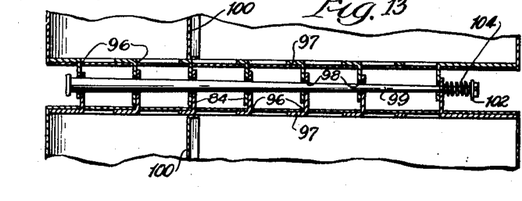
Figure 13 is a sectional detail view showing a modified form of hinge.

Another means for taking up any free play around the axis of the blade between adjacent sections is shown in Figure 13. In this structure the openings 98 in the tabs 84 are of graduated size and the hinge pin 99 has a corresponding taper so that it will fit snugly into the openings. The head 101 of the pin 99 is displaced from the nearest tab 84 so as to provide for a limited longitudinal movement of the pin 99 to take up wear. The collar 102 provided at the other end of the pin is spaced beyond the adjacent tab 84, as shown in Figure 13, and a spring 104 is located between that collar and said tab.

It will readily be understood that the spring 104 keeps the hinge pin 99 in firm contact with all the aligned openings in the tabs 83 so that a torsion-resistant hinge joint is provided.

The blade sections can be fabricated in other ways than that described above. For example, as shown in Figure 14, an end wall 105, with hinged lugs attached, formed of a single piece, may be provided which is welded around its periphery to the top wall 89 and bottom wall 90. The top wall 89 and bottom wall 90 may be formed of a single sheet of metal bent to the proper shape and welded along the trailing edge 94 to complete the section.

We prefer to fill in the open spaces around the hinge elements and between the adjacent wing sections with readily compressible material. This filling may suitably be provided by two pieces 106 of molded sponge rubber, which are formed to correspond to the ends of the sections between which they are placed. The pieces 106 are, of course, formed with recesses to accommodate the hinge pin 99 and with slots through which the tabs 84 project. Each piece 106 is secured by cementing to an end of a wing section, the tabs 84 projecting into the slots provided therein. The sections are then placed end to end so as to bring the openings 98 in the tabs 84 into alignment, and the pin 99 is projected between the two abutting pieces 106 of rubber into the aligned openings.

Owing to the ready flexibility of the sponge rubber it may be pushed out of place to facilitate the entrance of the hinge pin 99 and the application of the collar 102 and cotter pin 103 and, in the case of the embodiment shown in Figure 13, the spring 104. When the wing is extended the two pieces 106 of sponge rubber are in the relation shown in Figure 10, and they provide smooth surfaces which are continuous with the surfaces of the adjacent sections. When the wing is wound up upon the drum 24, the lower portions of the pieces 106 are compressed, as shown in Figure 9.

The sponge rubber of which the pieces 106 are formed may be relatively "dead" so that the pieces absorb energy and dampen any vibrations in the wing in the plane of the axis of rotation. Other means for absorbing energy may be used for that purpose, if desired.

When the wings are fully or partly extended, they are held outwardly in the radial direction by centrifugal force. They are wound upon the drum against this tension. It is preferred that the outer sections of the wing shall tend to hold the free end of the wing against the drum so that if the drum continues to rotate after the wing is completely wound up it can do so without damage to the wing tips. This may readily be effected by providing suitable springs between adjacent sections in the tip of the wing. Thus, as shown in Figure 9, a spring or a suitable number of springs 107 may be provided in the hinge joints toward the wing tip. The spring 107 may have a central loop through which the hinge pin 99 passes, and it may have two arms 108 which extend upwardly and bear against the end walls of the adjacent wing sections.

As will readily be understood from Figure 9, these springs tend to move the adjacent wing sections into angular arrangement corresponding to their wound-up relation. As a result of these springs, the outer layer of the wound-up blade is resiliently held toward the drum. When the rotor structure is driven, as hereinbefore described, for the purpose of projecting or extending the wings, the centrifugal force due to rotation overcomes the action of the springs 107 and the adjacent sections move into the relation shown in Figure 10 as they clear the drum.

The springs 107 are also inclosed within the pieces 106 of sponge rubber which are formed with openings to receive them.

Figure 15:
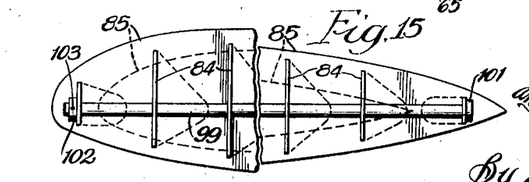
Figure 15 is an end view of an inner section shown in relation to an outer section.

It must be understood that the torsion increases inwardly along the wing and is greatest near the drum. We may make special provision near the drum to provide longer hinges near the drum. Thus, as shown in Figure 15, the innermost sections or layer of wing sections 85 may be made larger than the outer sections 85 to provide for longer hinge pins 99 and a greater number of tabs 84. Furthermore, the profile of the larger sections may be modified, principally by a relative thickening towards the trailing edge to provide more substantial tabs 84 for cooperation with a longer hinge pin. Owing to the low wing speed adjacent the hub the aerodynamic considerations are not so important as near the outer end of the wing and the profile may be sacrificed to some extent in the interest of strength and resistance to torsion near the hub.

While we have shown two wings 23, it must be understood that a greater number may be employed, if desired. As best shown in Figure 8, we prefer to decrease the thickness of the sections in the outward direction of the blade. This decrease may be gradual along the blade or it may be attained by the employment of transition sections, as shown in Figure 1.

Figures 16, 17:
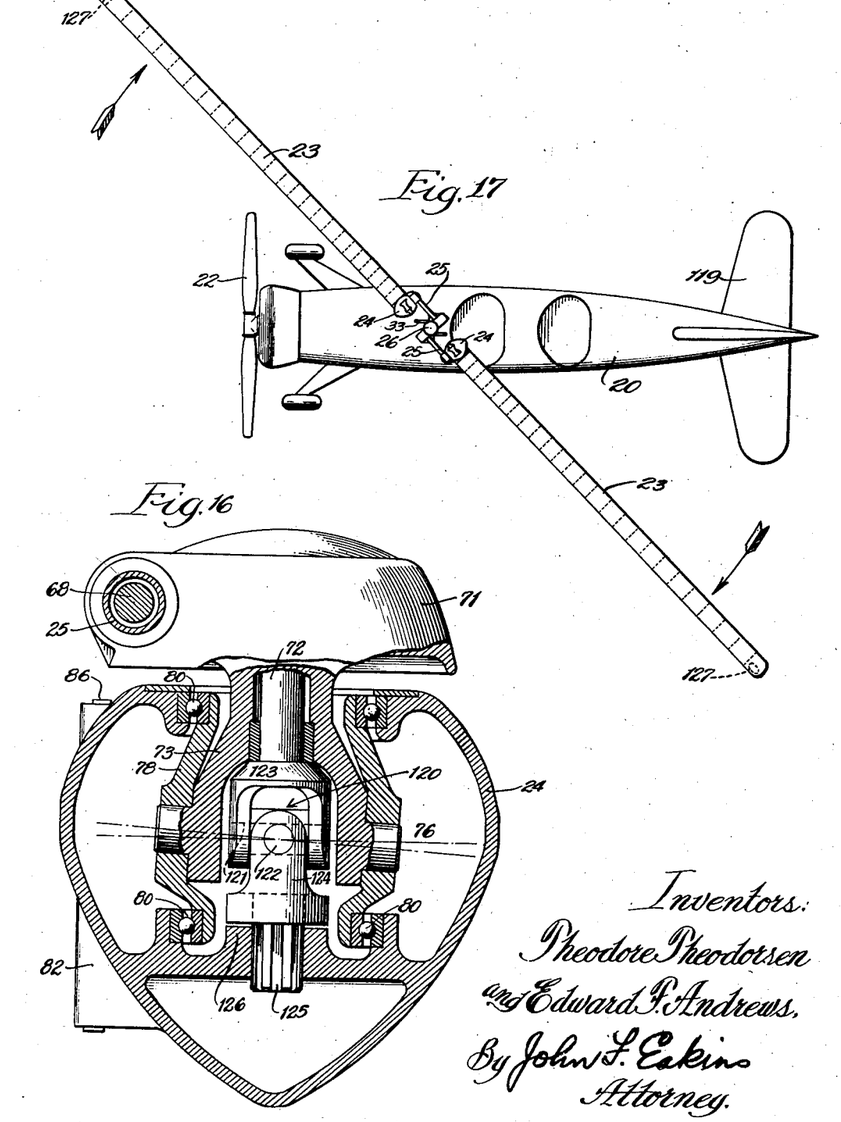
Figure 16 is a sectional view through a modified form of drum.
Figure 17 is a plan view of an aircraft embodying my invention.

The embodiment of drum shown in Figure 16 shows a preferred streamlined form. In this embodiment the hub 78 is foreshortened and the shaft 72 is connected to the drum 24 by means of a universal joint member 120. This universal joint member may comprise two cross pins 121 and 122 pivotally mounted in bearings on members 123 and 124, respectively. The member 123 is carried on the end of the shaft 72. The member 124 carries a stub shaft 125 splined into a boss on the drum 24. It is to be noted that in this embodiment the drum 24 rotates in the same direction as the shaft 72 and consequently the shaft 68 must be driven in a direction opposite to that of this shaft in the first described embodiment in order to drive the drum in the same direction. In this embodiment of drum structure the axis of the trunnions 76 is displaced from the plane at right angles to the shaft 72 to an extent to render this axis parallel to the axis of the hub 26 about which the structure rotates.

We may provide weights 127 in the outermost sections of the wings. These weights accentuate the centrifugal force of the wing and may be used to balance the wing. For this purpose they are preferably located adjacent the forward edge of the wing and have a tendency to bring the centers of gravity forward towards the aerodynamic centers of the wings.

Although the invention has been described in connection with the specific details of a preferred embodiment thereof, it must be understood that such details are not intended to be limitative of the invention except in so far as set forth in the accompanying claims.

We claim:

1. In combination, a rotating aircraft wing, a drum to which the inner end of said wing is fastened, said wing having hinges at a plurality of points along its span, each hinge extending a substantial distance along the chord from front to rear, and means for rotating said drum to wind said wing around it.

2. In combination, a rotating aircraft wing including a plurality of rigid sections hinged together near the leading edge and the trailing edge to permit the wing to bend in the plane of its thickness, and a drum to which the inner end of the wing is attached for winding thereon.

3. In combination, a rotating aircraft wing composed of a number of rigid sections hinged together near the leading edge and the trailing edge to permit the wing to bend in the plane of its thickness, and means for forming the wing into a compact coil for storage.

4. A rotating wing system for aircraft comprising a hub, a drum carried by said hub, a wing composed of a plurality of rigid sections hinged together near their leading and trailing edges attached to said drum so as to be rigid therewith in the plane of the chord, means for pivoting said drum so that the wing and the drum move forward or backward in the plane of the chord, and means for rotating said drum to wind up said wing therearound.

5. In combination, a wing storage drum, a wing attached thereto, means for pivotally supporting said drum so that it may move with the wing attached thereto in the plane of the wing chord, and means within said drum for causing it to rotate and wind up the wing around it.

6. In combination, a wing storage drum, a wing hinged to bend in the direction of its thickness but rigid in the plane of its chord attached thereto, pivot means within said drum about which said drum and said wing may pivot in the general plane of the wing chord, and means for winding said wing around said drum for storage.

7. In combination, a wing storage drum, a multiple-section wing attached thereto, adjacent sections being hinged together near the front, near the middle and near the rear of the wing chord, and means within said drum for rotating it to wind up said wing thereupon.

8. A rotating wing system for aircraft comprising a hub, arms carried by said hub, drums carried by said arms, torsionally rigid hinge jointed wings carried by said drums, and means carried by said hub and said arms for rotating said drums to wind up said wings thereupon.

9. In a rotating wing for aircraft comprising a plurality of rigid sections hinged together, a thin metal shell of air foil contour forming the surface of each section, an end plate attached to each end thereof, a plurality of hinge lugs extending outwardly from said end plates at intervals along the chord of said wing from front to rear, said hinge lugs being provided with holes, a hinge pin passing through the holes in all the lugs on the end plate of one section and all the lugs on the end plate of an adjacent section to form a hinge connecting adjacent sections, and a stiffening member extending through the section from one end to the other and from the bottom surface to the top surface substantially at the thickest point of the wing section to prevent said sections from deforming when wound up into a coil.

10. In a rotating wing system, a drum, a wing rigid in the plane of its chord and against torsion but hinged on a plurality of parallel axes to bend in the direction of its thickness, and means securing said wing to said drum rigidly in the plane of the wing chord and for pivotal movement on an axis parallel to said axes and in the plane of the wing thickness.

11. In combination, a wing comprising a plurality of rigid sections pivotally connected in series on parallel axes to permit the wing to be wound up into a coil, said sections each comprising a hollow body of airfoil contour, and a stiffening web in each section in the plane of contact between the sections when the wing is coiled up.

12. In an aircraft, a rotating wing assembly, a non-rotating member supporting said assembly, a universal joint connecting said non-rotating member to said aircraft, a hub carried by said assembly, a plurality of wing storage drums mounted upon said hub, flexible wings attached to said drums and adapted to be extended from and wound up around said drums by the rotation thereof, the axes of said drums lying in substantially the same plane as that of said universal joint.

13. In an aircraft a rotating wing assembly including a hub, arms attached to said hub, drums carried by said arms, wings carried by said drums adapted to be extended or wound up by rotation of said drums, gears carried by said hub, shafts extending through said arms, and gears connecting said shafts to said drums whereby said drums may be rotated in either direction.

14. In a rotating wing structure, in combination, a hub, an arm member carried by said hub, a hollow shaft member pivotally mounted on said arm member, a wing storage drum rotatably mounted on said shaft member, a coilable wing attached to said drum, and means carried by said hub and arm member for rotating said drum in either direction upon said shaft member.

15. In combination, a drum, a fluid-engaging blade, including a large number of sections hinged together on parallel axes at widely separated points along its chord, one of said sections being pivotally attached to said drum on an axis parallel to said axes around which drum said blade is adapted to be wound for compact storage.

16. In a rotating wing structure, in combination, a hub, an arm carried thereby, a spindle member pivotally mounted on said arm, a drum rotatably mounted on said member, a coilable wing attached to said drum, and damping means controlling the pivotal movement of the drum on said arm.

17. In combination, a rotating wing structure and universal joint means supporting said structure, said structure comprising a plurality of coilable wings and means to which they are pivotally connected, said pivotal connecting means being in substantially the same plane as the universal joint means.

18. In combination, a rotatable arm, a drum, a spindle carrying said drum, said spindle being pivotally mounted on said arm, and drive means including an internal gear in said drum, gears on said spindle meshing therewith, and a spherical central gear meshing with the gears on said spindle.

19. In combination, a rotatable arm, a drum, a spindle carrying said drum, said spindle being pivotally mounted on said arm, and interior gearing in the pivotal plane of the spindle for effecting the drive of the drum.

20. In combination, a drum, a wing torsionally stiff and bendable in the direction of its thickness about a plurality of axes parallel to the axis of the drum adapted to be coiled on the drum, and a hinge parallel to the chord of the wing and the axis of the drum connecting the wing to the drum.

21. In combination, a drum, a wing adapted to be coiled thereon comprising a series of rigid sections, and hinges connecting said sections together and to the drum, said hinges being parallel to the axis of the drum.

22. The method of making a wing section which comprises stamping a sheet of metal to provide adjacent deformations corresponding to top and bottom portions, each of said portions comprising a main wall and end wall elements, bending said sheet to bring the ends of the sheet into engagement and the edges of the wall elements into engagement, welding said extremities together, and welding the engaging end wall elements together.

23. In a section of a multisection rotating wing for aircraft, an integral hollow airfoil shell comprising an upper member and a lower member integrally united at the forward edge of the section, each of said members comprising an outer wall and end wall portions, said outer walls being welded together to provide the rear edge of the section, and the complementary end members being welded together to provide the end walls of the shell.

24. A rotating wing structure including a drum, a wing composed of a number of rigid sections hinged together to bend in the direction of their thickness attached thereto, said sections having an outer shell of aerofoil form, a reinforcing member within said shell in the vicinity of the greatest thickness of said section, means for winding said wing around said drum in a plurality of layers, and means for causing the surface of said sections to contact said drum and other said sections substantially at the point of said reinforcement.

25. A rotating wing composed of a number of rigid aerofoil sections, torsionally rigid hinges connecting adjacent sections and maintaining substantial separations therebetween, and compressible material, also of airfoil section, filling said separations with the surface of said compressible material substantially coinciding with the aerofoil contour and forming a continuous wing surface bendable in the direction of the wing thickness.

26. In a rotating wing, a blade of aerofoil form comprising a number of torsionally stiff sections extending outwardly from a central hub toward the blade tip, a torsionally rigid hinge connecting adjacent sections near the hub across the chord at a plurality of points forwardly from the center of said chord, another similar hinge connecting adjacent sections near the tip, and a plurality of additional similar hinges connecting adjacent sections therebetween, and manually controllable means for causing adjacent sections to bend relatively to each other to compact said blade adjacent said central hub during rotation of said rotating wing.

27. In a rotating wing, a blade of aerofoil form comprising a plurality of torsionally stiff sections subject to high tension loads due to centrifugal force, each section including a surface member extending around the front edge of said blade from the top to the bottom thereof adapted to carry both tension and torsional stresses, a plurality of hinge members at opposite ends of each section and connected to the surface member in tension communicating relation, the hinge members of adjacent sections being hinged together at a plurality of points from the center of the chord forwardly, and hinge pins means located between the top and bottom surface of said sections and at a substantial distance from adjacent sections to permit substantial bending of adjacent sections in upwardly and downwardly directions 28. In an aircraft, a rotating wing system mounted thereon, a plurality of drums mounted on generally horizontal axes forming a part of said system, an airfoil section wing comprising a number of rigid sections flexible only in the direction of their thickness, attached at its inner end to each drum with its chord substantially parallel to the axis of said drum, each said drum comprising means for preventing twisting about its torsional axis, and means for similarly revolving each drum with respect to the wing attached thereto so that each wing is wound up upon its respective drum for compact storage.

29. In an aircraft, a rotating wing system mounted thereon, a plurality of drums mounted on generally horizontal axes forming a part of said system, an airfoil section wing comprising a number of rigid sections flexible only in the direction of their thickness, attached to each drum with its chord substantially parallel to the axis of said drum, means for similarly revolving each drum with respect to the wing attached thereto so that each wing is wound up upon its respective drum for compact storage, means for preventing twisting of the wings about their torsional axes, and means for maintaining said wings in at least one partly unwound position.

30. In an aircraft, a plurality of airfoils extending outwardly in a general radial direction from a central axis around which they rotate, each airfoil consisting of a series of rigid sections of progressively varying length pivotally connected whereby they may be wound into a coil.

31. In an aircraft, a plurality of airfoils extending outwardly in a general radial direction from a central axis around which they rotate, the chords of said airfoils lying in the general direction of the plane of rotation, each airfoil consisting of a series of links pivotally connected to permit bending in the direction of the thickness, rotatable means for winding said links into a coil around a generally horizontal axis, and means for imparting torsional rigidity to said airfoils comprising a plurality of hinge connections along the chord forward of its center at the pivotal connections between the links, whereby their chords are held substantially fixed in the general direction of their plane of rotation.

32. In an aircraft, a plurality of airfoils extending outwardly in a general radial direction from a central axis around which they rotate, the chords of said airfoils lying in the general direction of the plane of rotation, said airfoils being flexible in the direction perpendicular to their plane of rotation, drum means rotatable about generally horizontal axes for winding said airfoils into coils in this direction for compact storage, and irreversible drive means for said drum means adapted to lock said airfoils in a partly extended condition.

33. In an aircraft, a drum mounted thereon to rotate around an axis of rotation, said drum having its axis substantially perpendicular to the axis of rotation, a wing including a series of torsionally rigid sections hinged together with hinge axes generally parallel to the wing chord, means to rotate said drum around the axis of rotation to hold said wing extended by centrifugal force, and means to rotate said drum on its own axis relative to the wing to wind said wing therearound for storage.

34. In combination, an aircraft wing comprising a series of torsionally rigid sections, pivot means connecting said sections together, and a drum having an axis generally horizontal and parallel to said pivot means to which the inner end of the wing is secured, means to rotate the drum whereby the rotation of the drum on its axis relative to the wing will wind said wing into a coil around said drum with the chord of the wing substantially parallel to the axis of the drum.

35. In combination, an aircraft wing comprising a series of torsionally rigid sections, a polygonal drum to which the inner end of the wing is secured, said drum having its axis generally horizontal, said sections being connected together by hinge joints so that rotation of the drum relative to the wing will wind the wing into a coil around the drum with the chord of the wing substantially parallel to the axis of the drum and the span of the sections lying parallel to the polygonal sides of said drum, and means to rotate the drum.

36. In combination, an aircraft wing comprising a series of torsionally rigid sections, a polygonal drum to which the inner end of the wing is secured, said drum having its axis generally horizontal, said sections being connected together by hinge joints so that rotation of the drum relative to the wing will wind the wing into a coil around the drum with the chord of the wing substantially parallel to the axis of the drum and the span of the sections lying parallel to the polygonal side of said drum, the sections in each layer of the coil being progressively greater in the outward radial direction of the coil, and means to rotate the drum.

37. A rotating airfoil system having a blade of airfoil section comprising a number of rigid sections flexible only in the direction of their thickness, means permanently located adjacent the axis of rotation of said rotating airfoil system for winding the blade into a coil in a direction of flexibility around its inner end, means for preventing excessive torsional bending around an axis in the general longitudinal direction of the blade when extended, said blade being of stable section, having its center of gravity and elastic axis close to its aerodynamic center, and means inherently damping said blade.

THEODORE THEODORSEN.
EDWARD F. ANDREWS.